UNITED STATES PATENT OFFICE.

PHILIP SCHIDROWITZ AND OTTO ROSENHEIM, OF LONDON, ENGLAND, ASSIGNORS TO THE JOSEPH TURNER & COMPANY, LIMITED, OF QUEENSFERRY, ENGLAND.

PIPERIDIN DERIVATIVE.

SPECIFICATION forming part of Letters Patent No. 597,745, dated January 25, 1898.

Application filed March 2, 1897. Serial No. 625,769. (Specimens.)

*To all whom it may concern:*

Be it known that we, PHILIP SCHIDROWITZ and OTTO ROSENHEIM, of 57 Chancery Lane, London, England, have invented certain new and useful Improvements in the Manufacture of Derivatives from Piperidin and its Homologues, of which the following is a specification.

This invention relates to the manufacture of derivatives from piperidin or its homologues.

The invention consists in causing piperidin or its homologues to react with a phenol or with organic phenols, the phenol ethers, phenol acids, and nitro phenols and nitro acids.

By this invention new and important bodies are obtained of distinctive chemical nature and which have marked pharmacological and therapeutic properties.

In carrying out the invention we preferably employ as the phenol an ether of monoxyphenol, such as guaiacol, which we cause to react with piperidin; but other oxy, dioxy, or trioxy phenols or nitro phenols may be employed—such, for example, as hydroquinone, pyrogallic acid, gallic acid, tannic acid, and ortho-meta and paranitro phenols—or in lieu of these we may employ any equivalent thereof to react with the piperidin, as 1 2 4 dinitro-alpha napthol or dinitrobenzoic acid 1 3 5, which equivalents are to be understood as equally included within the term "phenol" as used herein, and in lieu of piperidin we may employ any of its homologues, all of which are intended to be included as equivalents in the term "piperidin" as hereinafter used.

The bodies are obtained by the interaction of molecular proportions either alone or in the presence of a suitable solvent. We have found that in the case of guaiacol two molecules of guaiacol to one molecule of piperidin give the best results.

Having explained the nature of our invention, we will further illustrate it by means of an example; but we premise that this example is merely typical and that the details and constituents may be varied as required.

Example: 24.8 kilos of guaiacol are dissolved in 8.5 kilos of piperidin in a vessel which it is best (but not necessary) to provide with a suitable cooling apparatus, as considerable heat is evolved by the chemical action. After a time the contents of the vessel become solid, more especially if a few crystals of the compound are introduced into the liquid. The product thus obtained is recrystallized from a suitable solvent, or in this case a mixture of benzene and petroleum spirit is considered best. The crystals obtained are colorless prisms or plates of considerable size, fairly soluble in water and easily soluble in most organic solvents. The melting-point of these crystals is 79° to 81° centigrade. The body agrees with the formula $(C_7H_8O_2)_2C_5H_{11}N$. The compound may also be obtained in a pure state by dissolving the piperidin in petroleum ether and the guaiacol in benzene and mixing the solutions, or by pouring the liquid first obtained by the action of the two constituents into a mixture of petroleum ether and benzene. The crystals form very rapidly in the solution on cooling or on the addition of a few crystals.

We are aware that B. v. Lachowicz (Wiener Monatshefte für Chemie 1888, 505) obtained a body by the action of hydroquinone on piperidin in alcoholic solution, to which he gave the name of "dipiperil-benzoquinone;" but dipiperil-benzoquinone has very different characteristics from the body obtained by our invention. Dipiperil-benzoquinone has the character of a dyestuff and is a deep red. If, however, hydroquinone is allowed to act on piperidin in ethereal solution, a perfectly white body is obtained, which if left to stand in solution would be slowly transformed into the red body obtained by Lachowicz. The white product which is obtained according to our invention has a melting-point of 106° to 107° centigrade and is easily soluble in water and most solvents, whereas the red body above mentioned melts at 178° centigrade and is insoluble in water and fairly insoluble in most organic solvents. It is characteristic of most of the bodies obtained by our invention that they are easily soluble in water.

The bodies obtained by our invention form soluble bodies of the nature of organic salts by virtue of the basic character of (for example) piperidin on the one hand and the acid character of (for example) pyrogallic acid or guaiacol on the other hand.

What we claim, and desire to secure by Letters Patent, is—

1. The process hereinbefore described of manufacturing derivatives of piperidin, which consists in acting upon piperidin with an ether of a monoxyphenol, substantially as set forth.

2. The process hereinbefore described of manufacturing derivatives of piperidin, which consists in acting upon piperidin with an ether of a monoxyphenol in the presence of a suitable solvent, substantially as set forth.

3. As a new product, a derivative from piperidin being a crystalline substance in prismatic plates having a melting-point of 79° to 81° centigrade, being fairly soluble in water and easily soluble in most organic solvents (such as benzene) and agreeing with the formula $(C_7H_8O_2)_2C_5H_{11}N$.

In witness whereof we have hereunto signed our names in the presence of two subscribing witnesses.

PHILIP SCHIDROWITZ.
OTTO ROSENHEIM.

Witnesses:
GEORGE C. BACON,
THOMAS L. WHITEHEAD.